US012562501B2

(12) United States Patent
Menargues Gomez et al.

(10) Patent No.: US 12,562,501 B2
(45) Date of Patent: Feb. 24, 2026

(54) DUAL-POLARIZATION ANTENNA

(71) Applicant: SWISSto 12 SA, Renens (CH)

(72) Inventors: Esteban Menargues Gomez, Préverenges (CH); Lionel Simon, Lausanne (CH); Santiago Capdevila Cascante, Renens (CH)

(73) Assignee: SWISSto12 SA, Renens (CH)

( * ) Notice: Subject to any disclaimer, the term of this patent is extended or adjusted under 35 U.S.C. 154(b) by 342 days.

(21) Appl. No.: 17/757,319

(22) PCT Filed: Dec. 16, 2020

(86) PCT No.: PCT/IB2020/062059
§ 371 (c)(1),
(2) Date: Jun. 14, 2022

(87) PCT Pub. No.: WO2021/124170
PCT Pub. Date: Jun. 24, 2021

(65) Prior Publication Data

US 2023/0011966 A1 Jan. 12, 2023

(30) Foreign Application Priority Data

Dec. 18, 2019 (FR) ...................................... 1914809

(51) Int. Cl.
*H01Q 21/24* (2006.01)

(52) U.S. Cl.
CPC .................................. *H01Q 21/24* (2013.01)

(58) Field of Classification Search
CPC .... H01Q 21/24; H01Q 1/288; H01Q 13/0258; H01Q 21/0006; H01Q 21/064; H01P 5/12
See application file for complete search history.

(56) References Cited

U.S. PATENT DOCUMENTS

2011/0267250 A1 11/2011 Seifried et al.
2017/0117637 A1 4/2017 Jensen et al.
2019/0190161 A1* 6/2019 Hollenbeck .......... H01Q 15/242

FOREIGN PATENT DOCUMENTS

WO 2013089456 A1 6/2013
WO 2015134772 A1 9/2015
WO 2017053417 A1 3/2017
WO 2019226201 A2 11/2019

OTHER PUBLICATIONS

International Search Report for issued in Application No. PCT/IB2020/062059 dated Mar. 12, 2021.
Written Opinion for PCT/IB2020/062059 dated Mar. 12, 2021.

* cited by examiner

*Primary Examiner* — Dieu Hien T Duong
(74) *Attorney, Agent, or Firm* — McDonald Hopkins LLC

(57) ABSTRACT

Dual-polarized antenna, including several antenna elements arranged in cell units. Each cell unit includes four antenna elements and two 1-to-4 junctions, a first of the two junctions being associated with a first polarization and a second of the two junctions being associated with a second polarization. The antenna also includes an array of dividers/combiners. The four antenna elements of each cell unit are superposed and several cell units are juxtaposed. Each cell unit includes two antenna elements and two other antenna elements which are offset.

14 Claims, 12 Drawing Sheets

DUAL-POLARIZATION ANTENNA

FIELD OF THE INVENTION

The present invention relates to a radio frequency (RF) module, intended to form the passive part of a Direct Radiating Array (DRA).

BACKGROUND

Antennas are elements that are used to transmit electromagnetic signals into free space, or to receive such signals. Simple antennas, such as dipoles, have limited performance in terms of gain and directivity. Parabolic antennas provide higher directivity, but are bulky and heavy, making them unsuitable for applications such as satellites, where weight and volume must be reduced.

Also known are DRA arrays that combine multiple radiating elements (antenna elements) that are phase shifted to improve gain and directivity. The signals received on or transmitted by the different radiating elements are amplified and phase shifted between them so as to control the shape of the receiving and transmitting lobes of the array.

At high frequencies, for example at microwave frequencies, the different radiating elements are all connected via a waveguide array to a port for connecting the antenna to an electronic circuit comprising, for example, an RF electronic circuit and an amplifier.

Dual polarization antennas which are capable of transmitting or receiving signals with two polarizations simultaneously are also known. In this case, the signals transmitted or received by each antenna element are combined, respectively separated, according to their polarization by means of a polarizer. The polarizer can also be integrated in the antenna element. A dual-polarized antenna has two ports for connecting each of the two polarizations separately respectively to and from the electronic circuit.

Such antennas for transmitting high frequencies, especially for microwave frequencies, are difficult to design. In particular, it is often desired to bring the different elementary antennas of the array as close together as possible in order to reduce the amplitude of the secondary transmission or reception lobes, in directions other than the direction of transmission or reception which must be favored. This reduction of the pitch between the different elementary antennas of the array is however incompatible with the footprint of the waveguide array necessary to combine the signals received by the different elementary antennas, respectively to divide the signals to be transmitted.

In addition, it is often necessary to reduce the footprint of the antenna, especially its width and height in the plane perpendicular to the direction of signal transmission, in order to accommodate it in the reduced volume available in a satellite or aircraft.

Another aim in designing such an antenna is to reduce its weight, especially in space or aeronautical applications.

Examples of known antennas are described in WO2019/226201 A2, US2011/267250 A1, WO2017/053417 A1 and US2017/117637 A1.

An aim is to provide an antenna suitable for the Ka frequency band, especially for LHCP and RHCP polarized satellite communications.

Finally, it is also desirable to produce antennas with a new modular design that allows the number of elementary antennas to be varied as required, without having to redesign the entire antenna. The design is said to be modular when different types of antennas can be easily designed by adding or removing standardised antenna elements during the design of the antenna, without having to redesign the whole antenna or waveguide array. It is particularly desirable to be able to design an antenna in a modular way by adding units with several antennas while ensuring spatial filtering.

The antenna must also, of course, have very high efficiency gain and radiation pattern characteristics compatible with the specifications of the application.

Finally, the antenna must be capable of being manufactured industrially and without falling within the scope of existing patent protection.

BRIEF SUMMARY OF THE INVENTION

According to an aspect, a dual polarized antenna (RHCP, LHCP), comprises:

- at least one first port for connecting the antenna to an active circuit for transmitting or receiving a signal with a first polarization (LHCP);
- at least one second port for connecting the antenna to an or to the active circuit for transmitting or receiving a signal with a second polarisation (RHCP);
- a plurality of dual polarised antenna elements,
- the antenna elements being arranged in cell units,
- each cell unit including four antenna elements and two 1-to-4 junctions, a first of the two junctions being associated with a first polarisation and a second of the two junctions being associated with a second polarisation, each said junction comprising four branches for connecting to one of the polarisations of each antenna element of the corresponding unit and a common stub,
- an array of dividers/combiners for connecting the stub of each said 1-to-4 junction of a cell unit associated with the first polarisation with the first port and for connecting the stub of each said 1-to-4 junction associated with the second polarisation with the second port,
- the four antenna elements of each cell unit being superimposed,
- a plurality of cell units being juxtaposed,
- each cell unit comprising two antenna elements in a first plane and two other antenna elements in a second plane parallel to the first plane, said planes being offset from each other in a direction perpendicular to said planes by a distance less than the width of an antenna element.

This structure allows to build an array of elementary antennas, hereafter simply called antenna, in a modular way by juxtaposing antenna units each formed by four elementary antennas superimposed.

Each antenna unit has two 1-to-4 junctions and thus enables signals to be received and transmitted respectively according to two distinct polarizations.

Each antenna unit thus comprises four antenna elements superimposed but shifted two by two by two.

The arrangement of the antenna elements of each unit in two planes offset from each other in a direction perpendicular to the plane of the blade by a distance less than the width of an antenna element allows beamforming, or spatial filtering, of the signals received or transmitted within a cell unit, such that in particular directions the signals interfere constructively while in other directions the interference is destructive. This beamforming at the elementary level of each unit allows more freedom when combining antenna units since each antenna unit already has phase-shifted antenna pairs. It also facilitates the connection of the different antennas by means of the waveguide array linking the antennas together.

The terms “superposition”, “juxtaposition” or “stacking” describe the situation of an antenna oriented in a particular way with cell units formed by four antenna elements superposed on top of each other. However, it is self-evident that the antenna can transmit and receive independently of its orientation in space, and that the invention relates to any antenna which can be pivoted so that, in at least one possible orientation, the elements/components of the antenna are superposed, juxtaposed or stacked in the described and claimed arrangement.

The number of antenna elements is preferably exactly four.

The array of dividers/combiners connecting the antenna units to the ports preferably comprises a first sub-array of dividers/combiners comprising a stack of juxtaposed blades. Thus, it is easily possible to make an antenna with a larger number of antenna units by adding additional blades and/or by increasing the number of cell units per blade.

In each blade, the first sub-array of dividers/combiners is arranged to connect the stubs of each junction 1 to 4 of that blade together.

Some blades are associated with a first polarization and other blades are associated with the second polarization.

The first sub-array of dividers/combiners in the blades associated with the first polarization is arranged to connect together the stubs of junctions 1-4 associated with that first polarization. Similarly, the first sub-array of dividers/combiners in the blades associated with the second polarization is arranged to connect together the stubs of junctions 1-4 associated with that second polarization The first sub-array of dividers/combiners advantageously comprises an alternance of first blades associated with the first polarization and of second blades associated with the second polarization. Thus, each blade is dedicated to a single polarization.

The antenna advantageously comprises a second sub-array of dividers/combiners arranged to connect said first blades to each other and to the first port, and to connect said second blades to each other and to the second port.

Each blade preferably extends in a first direction substantially perpendicular to the direction of the signal transmission, and between the two planes defined by the extreme side edges of the antenna elements associated with that blade.

A first blade and a second blade preferably extend between the two planes defined by the extreme side edges of the antenna elements associated with these two blades. Thus, the width of the array of dividers/combiners is less than or equal to the maximum width of the associated antenna elements; the total width of the antenna is thus given by the width of the array of elementary antennas, and it is possible to add new antenna elements and connect them without the array of dividers/combiners determining the total width.

The second sub-array of dividers/combiners is advantageously provided between said blades and said ports.

The second sub-array of dividers/combiners preferably comprises waveguide portions extending in a second direction substantially perpendicular to the direction of the signal transmission.

In an embodiment, each blade is associated with four cell units.

Each antenna element can be connected to two neighboring blades.

In an embodiment, the antenna comprises 32 blades, 16 associated with a first polarization and 16 associated with the second polarization.

The first sub-array of dividers/combiners of each blade has at least one bifurcation in the H-plane.

Each antenna element preferably comprises a septum to combine in transmission or separate in reception the two polarizations of a radio frequency signal.

Each antenna element preferably has a square-shaped cross-section perpendicular to the direction of the signal propagation.

The antenna may be made in a monolithic manner.

The antenna can be made by 3D printing of a core and deposition of a surface layer at least on the inner side of this core.

BRIEF DESCRIPTION OF THE FIGURES

Examples of embodiments of the invention are shown in the description illustrated by the attached figures in which.

EXAMPLE OF EMBODIMENTS OF THE INVENTION

The present invention relates generally to an antenna array, referred to hereinafter simply as an antenna, and comprising several elementary antennas 3 (radiating elements) arranged in a matrix such that the openings of these elementary antennas are all in the same plane. The direction d of the signal transmission, both in the antenna and at the output of the antenna, is perpendicular to this plane.

Figure 1:
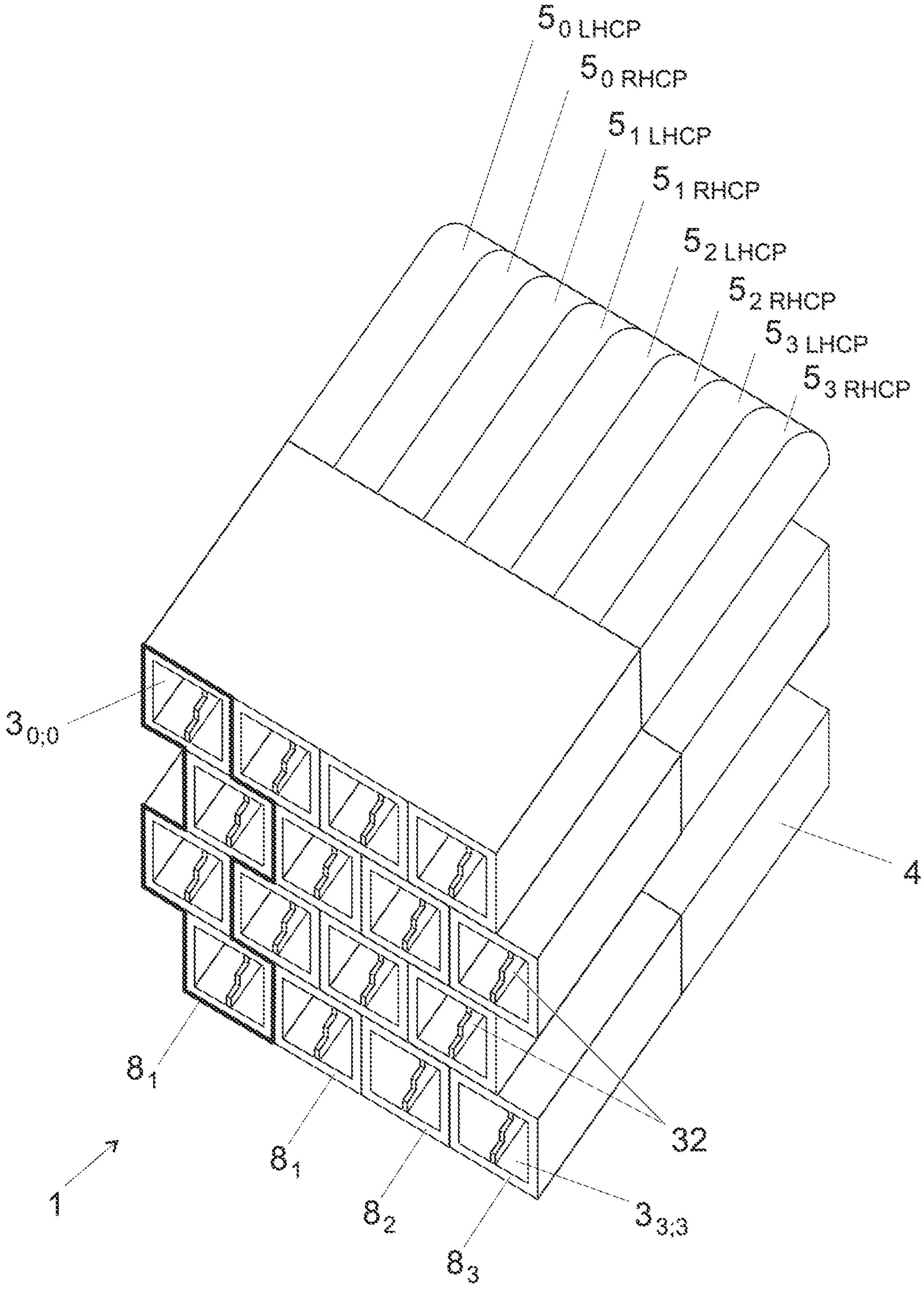
FIG. 1 shows a perspective view of an antenna comprising four cell units according to the invention.

FIG. 1 illustrates an antenna 1 comprising four juxtaposed cell units 8, each cell unit comprising four superposed elementary antennas 3. The antenna 1 of this example thus comprises 16 elementary antennas, numbered by row and column from $\mathbf{3}_{0;0}$ to $\mathbf{3}_{3;3}$ and forming a matrix with four rows and four columns, each column being formed in this example by a single cell unit. As will be seen later, the number of columns can be increased by juxtaposing additional cell units, and the number of rows can be increased by superposing additional cell units within each column.

The pitch between two adjacent antenna elements as well as the pitch between two rows is advantageously smaller than the nominal wavelength of the signal to be transmitted, thus reducing undesirable secondary lobes in transmission or in reception sensitivity.

The successive rows of the antenna are phase shifted; in the example shown, the even rows are phase shifted with respect to the odd rows by a pitch corresponding to half the width of an elementary antenna. This phase shift enables beamforming or spatial filtering of the signals received or transmitted by the antenna elements of the cell unit 8, so that in particular directions the signals interfere constructively while in other directions the interference is destructive.

The antenna elements 3 each include an aperture forming a radiating element directed towards the ether, and two connection ports to the junction 5 described later. One of the two ports is intended for a first polarization and the second is intended for the second polarization. The antenna includes a polarizer, preferably in the form of a septum 32 for separating the two polarizations LHCP and RHCP of a signal on reception respectively for combining the two polarizations on transmission. In another embodiment, the antenna elements 3 may comprise another type of polarizer, or be linked to a separate polarizer.

The antenna 1 further comprises a series of 1-to-4 junctions 5. Two junctions 5 are associated with each cell unit, in order on the one hand to divide respectively combine the LHCP first polarization signals of the four elementary antennas of the cell unit, and on the other hand to divide respectively combine the RHCP second polarization signals of the four elementary antennas of the cell unit. In this example, the number of 1-to-4 junctions is thus equal to 8.

In the case of an antenna comprising several superposed cell units 8, and thus more than 4 rows, the signals at the output of the junctions 5 are combined using a first power divider/combiner in the H-plane, separately for each polarization. A port 7 (FIG. 8) allows each polarization to be connected to an active electronic circuit.

Figure 2:
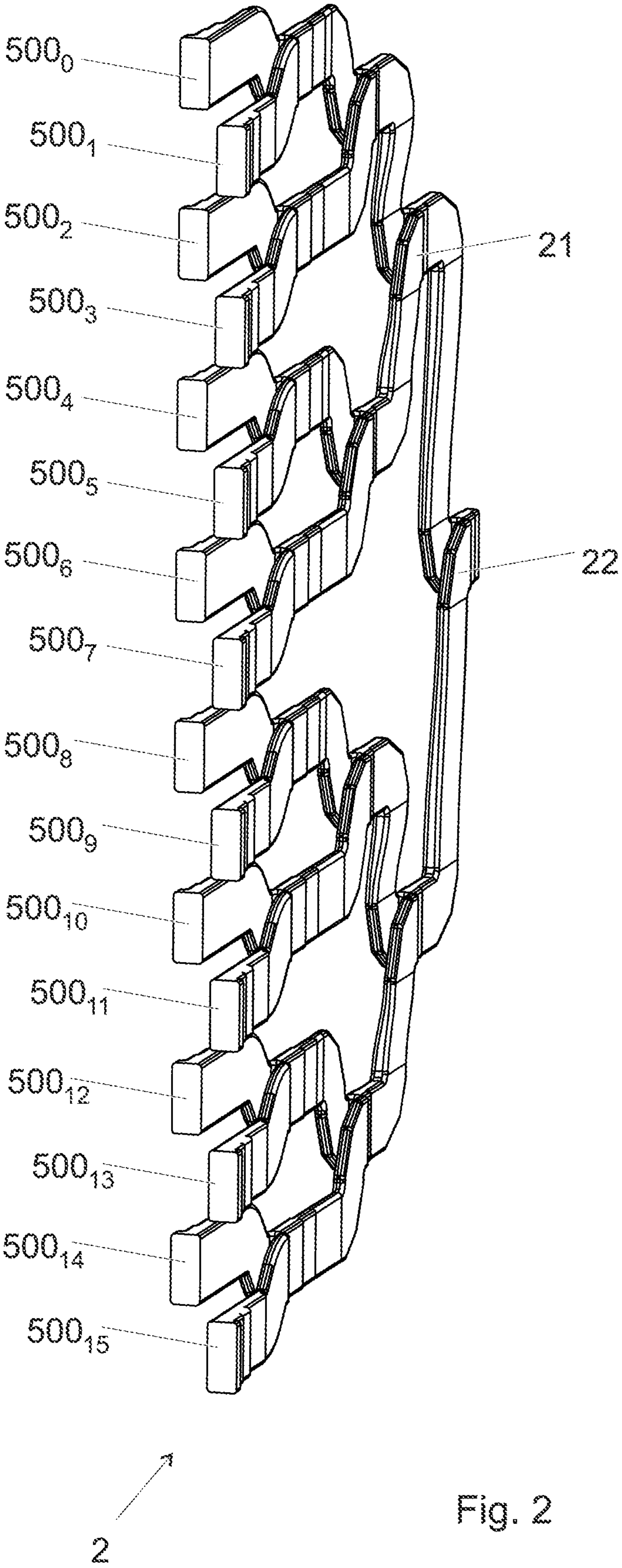
FIG. 2 shows an example of a blade for connecting together the first polarization of four superposed cell units.
Figure 3:
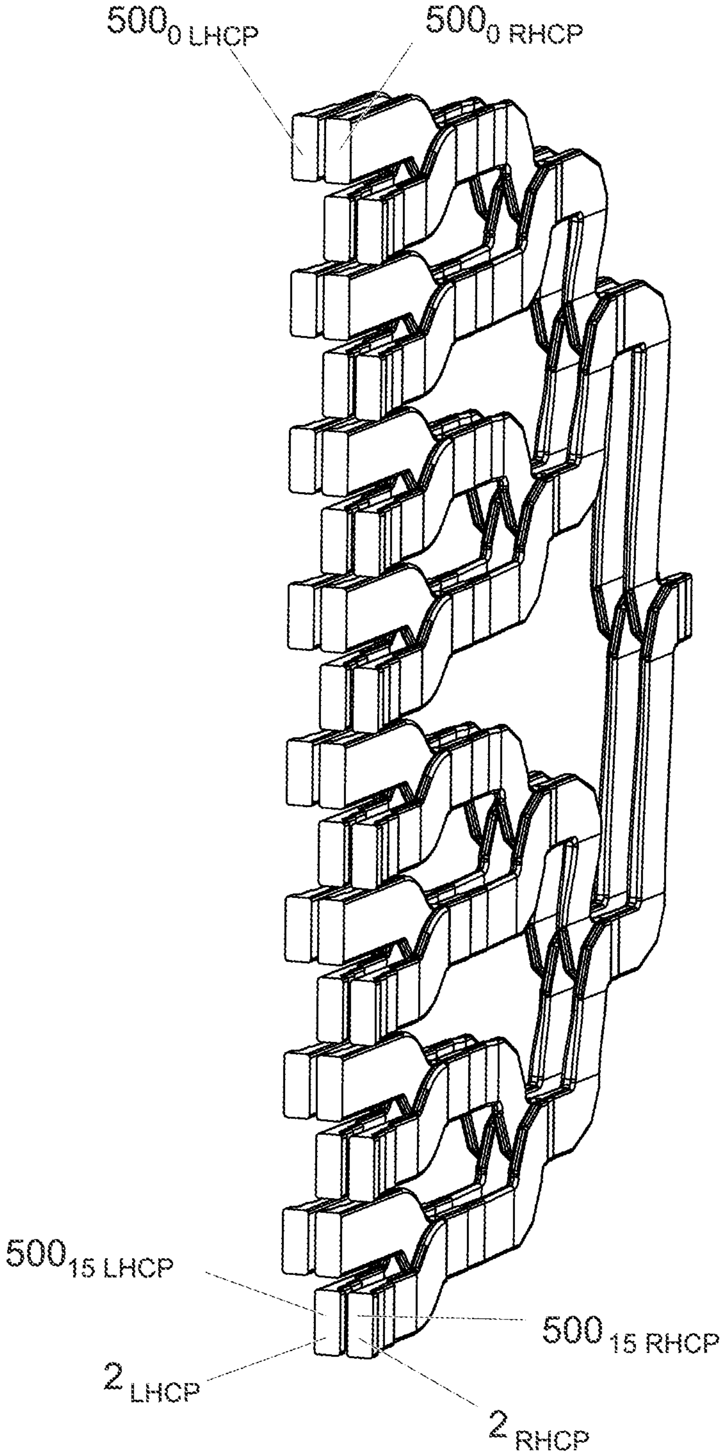
FIG. 3 shows an example of the juxtaposition of two blades designed to connect together the first and second polarization of four superposed cell units.
Figure 4:
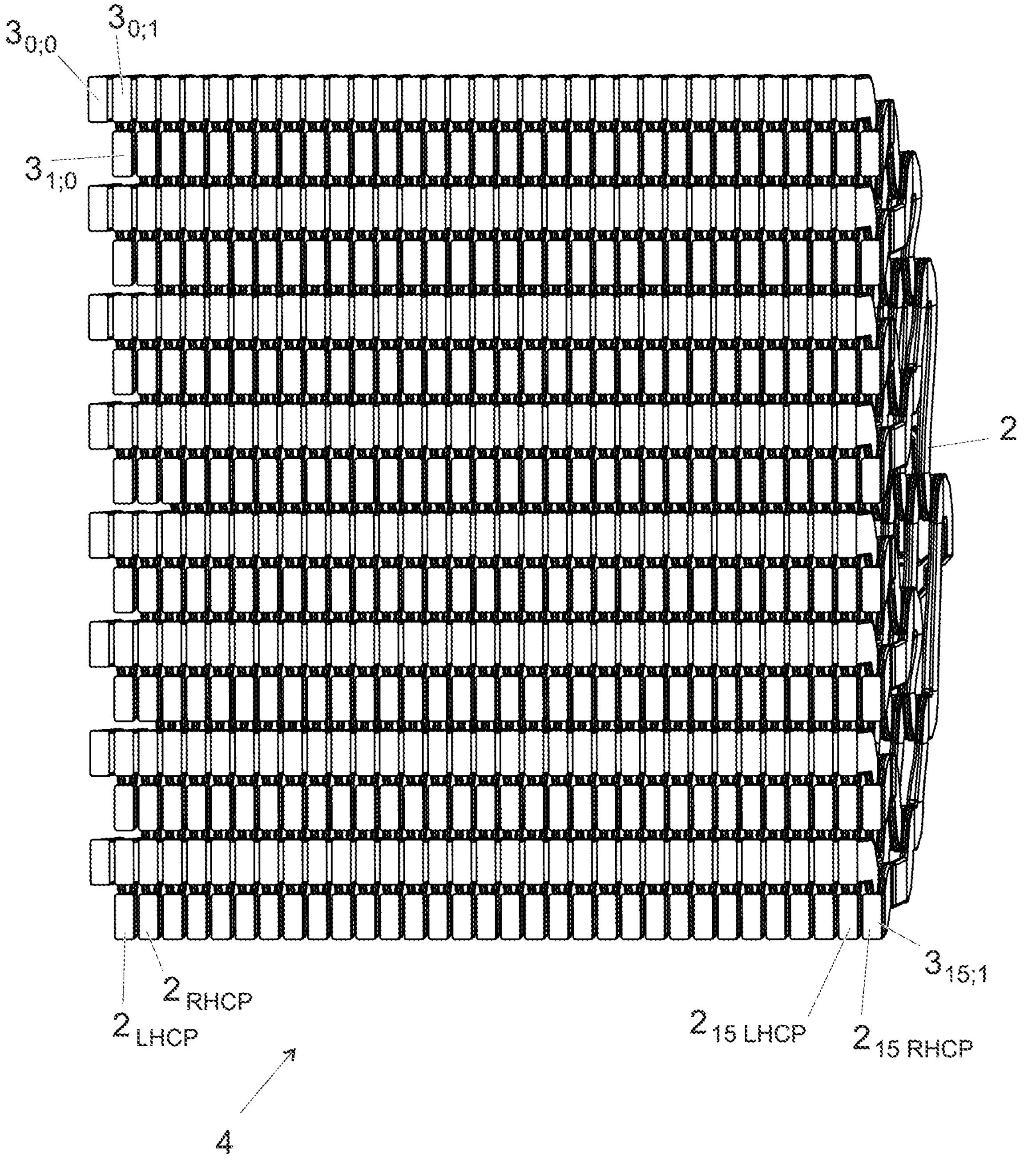
FIG. 4 illustrates a first array of dividers/combiners made up of 32 juxtaposed blades.

FIGS. 2 to 4 illustrate an example of a first divider/combiner 4 with the 1-to-4 junctions of the associated cell units, in the case of a dual polarization antenna comprising 16×16 antenna elements 3. The first divider/combiner consists of a number of juxtaposed blades 2, each blade being dedicated to one of the two polarizations LHCP or RHCP. As each antenna element provides two polarizations, the number of blades is therefore equal to twice the number of antenna elements per row, i.e. 32 blades in this example.

Each blade 2 is intended to be connected to all the antenna elements 3 of a column, i.e. to four cell units 8 superposed in this example. It therefore comprises branches $\mathbf{500}_0$ to $\mathbf{500}_{15}$, each of these branches being directly connected to one of the two output ports of one of the antennas. Two levels of 1-to-2 junctions in the H-plane form a 1-to-4 junction (reference 5) enabling the signals within each cell unit 8 to be combined/divided; the signal common to the stub 501 of the junctions in the blade 2 is combined using two further levels of 1-to-2 junctions in the H-plane, the signal resulting from the addition of the signals in all the branches 500 of a blade 2 thus ending up at the stub 23 of that blade.

FIG. 2 shows a single blade 2. FIG. 3 shows two juxtaposed blades, one dedicated to a first LHCP polarization of several superposed cell units and the other to the second RHCP polarization of the same cell units. FIG. 4 shows the juxtaposition of 32 blades 2 constituting the first array of dividers/combiners of the antenna.

Figure 5:
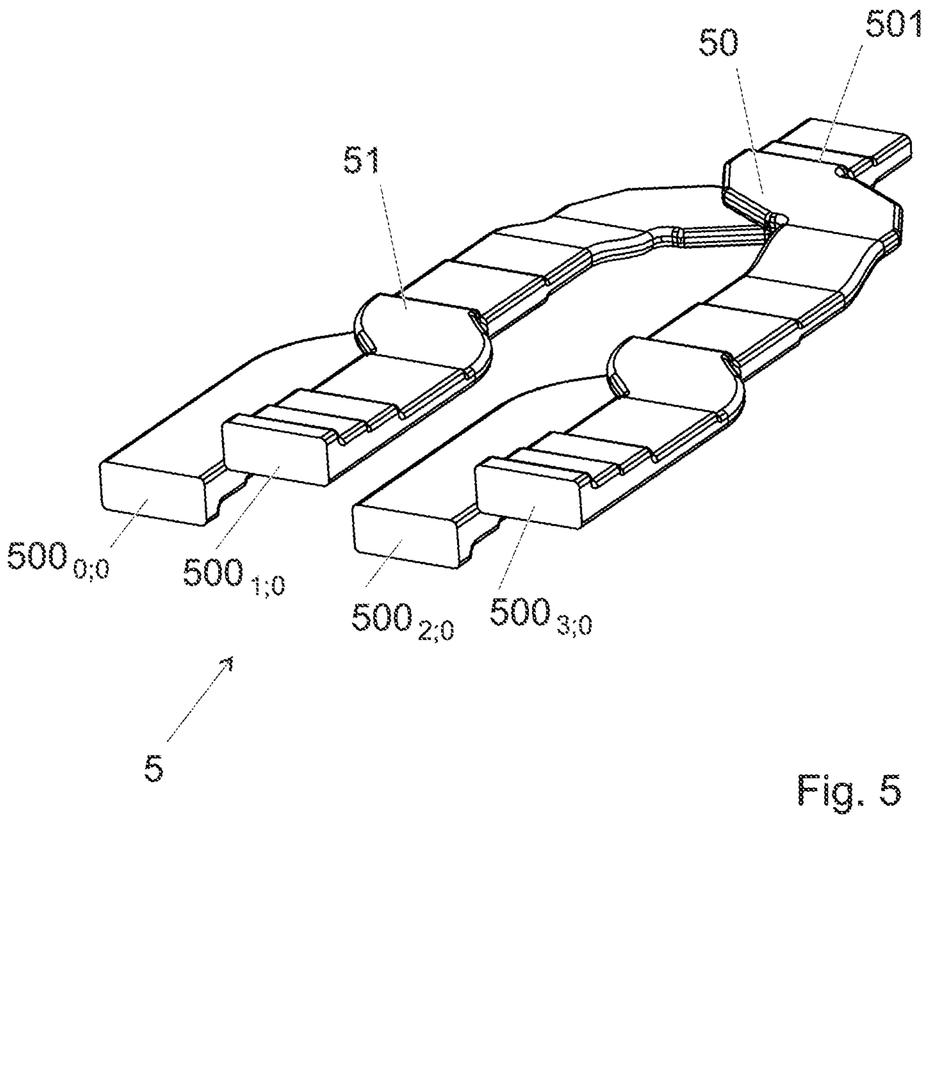
FIG. 5 shows a 1-to-4 junction comprising four branches to be connected to the first polarization of the elementary antennas of a cell unit, and a stub for the common signal.

FIG. 5 illustrates a 1-to-4 junction 5 present in each cell unit. The junction thus comprises four branches 500 for connection to four ports of the antenna elements 3 of a cell unit 8. The first level comprises two 1-to-2 junctions 51 for combining/dividing in pairs the signals of the same polarization of two superposed antenna elements. The two antennas of each pair being out of phase, the junction is made in the H-plane. A second 1-to-2 junction 50 then combines together the stubs of the two junctions 51, joined in a common stub 501.

Figure 6:
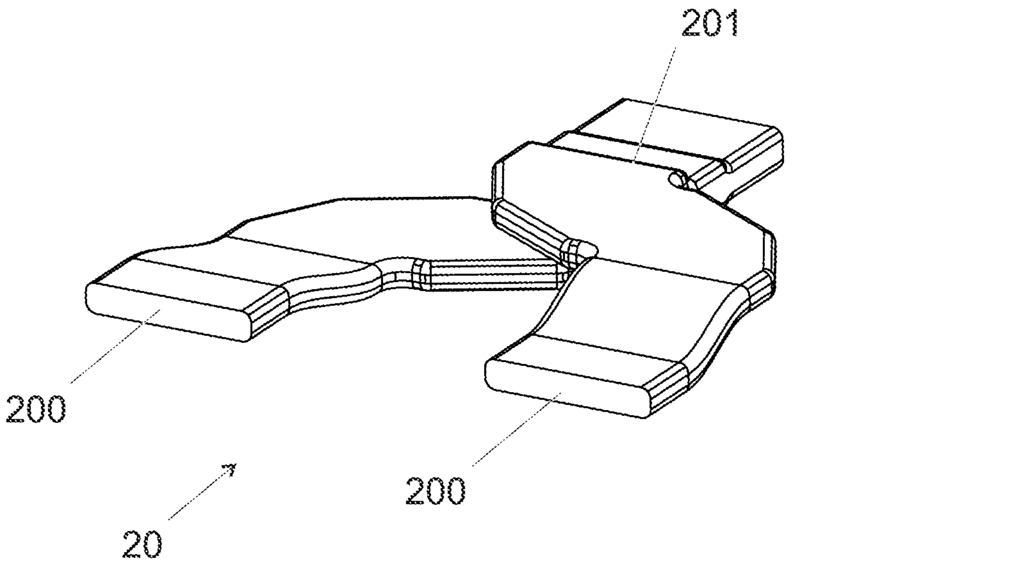
FIG. 6 shows a perspective view of a power combiner/divider in the H-plane.
Figure 7:
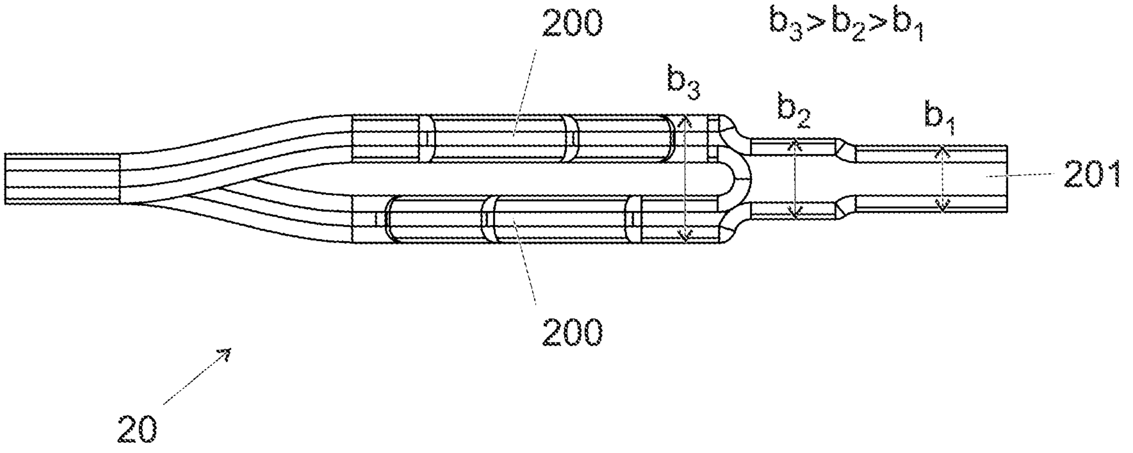
FIG. 7 shows a side view of a power combiner/divider in the H-plane.

FIGS. 6 and 7 illustrate in more detail an example of a 1-to-2 junction. This example relates to the first power divider/combiner 21 in the first array 4; however, the implementation of the 1-to-2 junctions 50 and 51 in the cell units, and of the second power divider/combiner 22 in the first array 4 may be the same or similar, with only the direction of the junction branches differing. As can be seen in particular in FIG. 7, the height b1 of the stub 201 is less than the height b2 of the portion of the junction in which the signals combine or divide, this height b2 being itself less than the total height b3 of the two branches 200.

Figure 8:
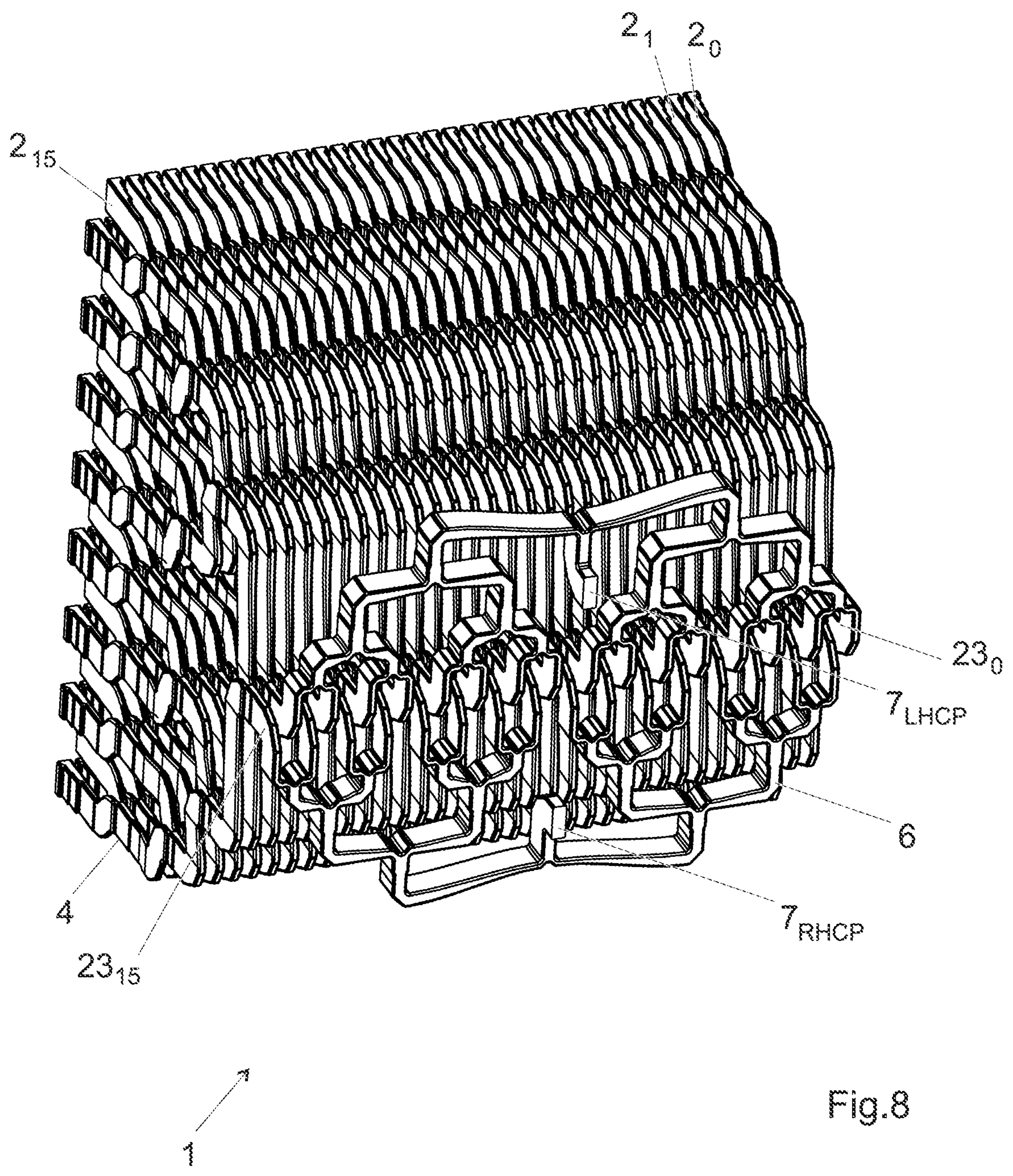

FIG. 8 shows the rear of the antenna 1, i.e. the side opposite the front side from which the antenna elements 3 point. In particular, this figure shows a second array of dividers/combiners 6 in the E-plane, intended to combine/divide the signals from the different blades 2, independently for each polarization. This array 6 comprises a first half-array $\mathbf{6}_{LHCP}$ for the first polarization LHCP, the branches of which form a first comb intended to be connected to the blades 2 of the first polarization. A second half-array $\mathbf{6}_{RHCP}$ for the second RHCP polarization comprises branches forming a second comb interposed between the first comb and intended to be connected to the second polarization blades 2. The stub of the first half array forms the first port $\mathbf{7}_{LHCP}$ of the antenna 1 and the stub of the first half array forms the first port $\mathbf{7}_{RHCP}$.

Figure 9:
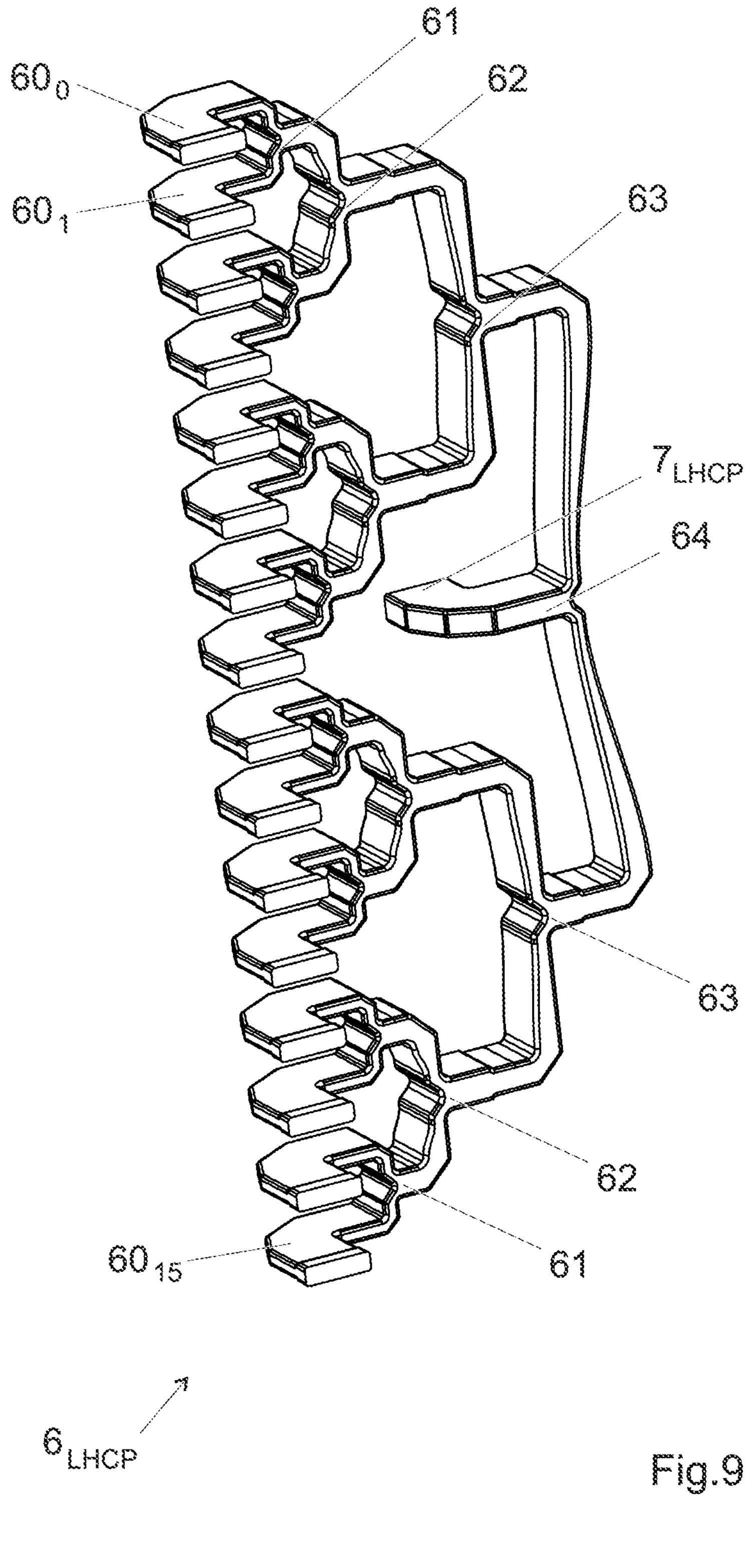
FIG. 9 shows a second array of dividers/combiners in the plane E.

FIG. 9 illustrates one of the half-arrays, for example the first half-array $\mathbf{6}_{LHCP}$. In the illustrated example, it comprises 16 branches $\mathbf{60}_0$ to $\mathbf{60}_{15}$ forming the comb intended to connect to the stub/port of the different blades 2. The number of branches 60 is of course dependent on the number of blades 2. Four levels of 1-to-2 junctions 61,62,63,64 in the E plane allow the signals of these different branches to be combined/divided successively in a common stub 7 forming one of the two ports of the antenna. The output of this stub 7 is angled at 90° to facilitate connection to a waveguide or directly to the electronic circuit.

Figure 10:
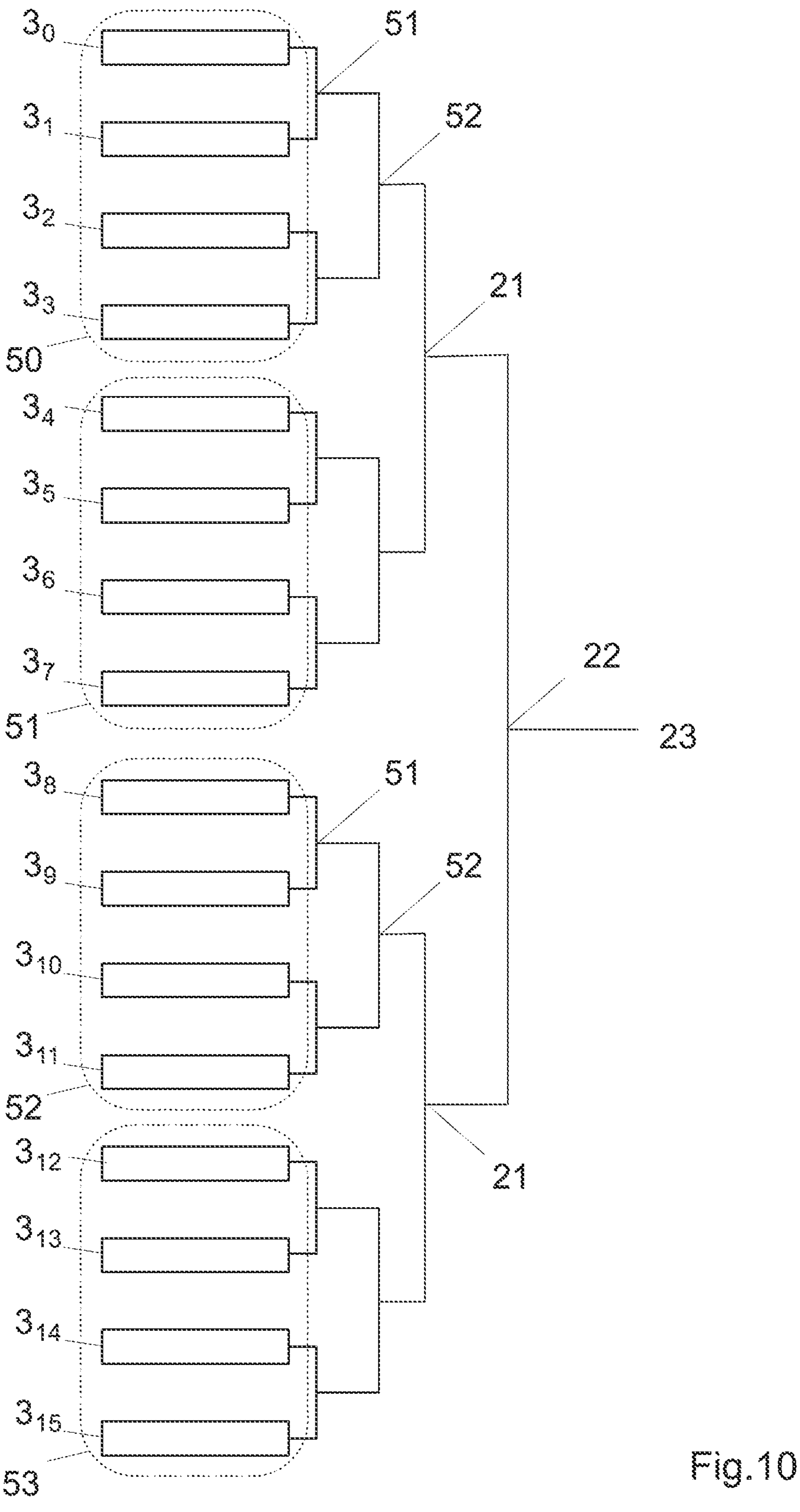
FIG. 10 shows schematically how one of the polarities of the superposed elementary antennas are connected via the associated blade.

FIG. 10 schematically illustrates the junction arborescence within each blade 2, with the blade combining both the first array of dividers/combiners 4 and the 1-to-4 junctions 5 of the cell units 8 associated with that blade.

Figure 11:
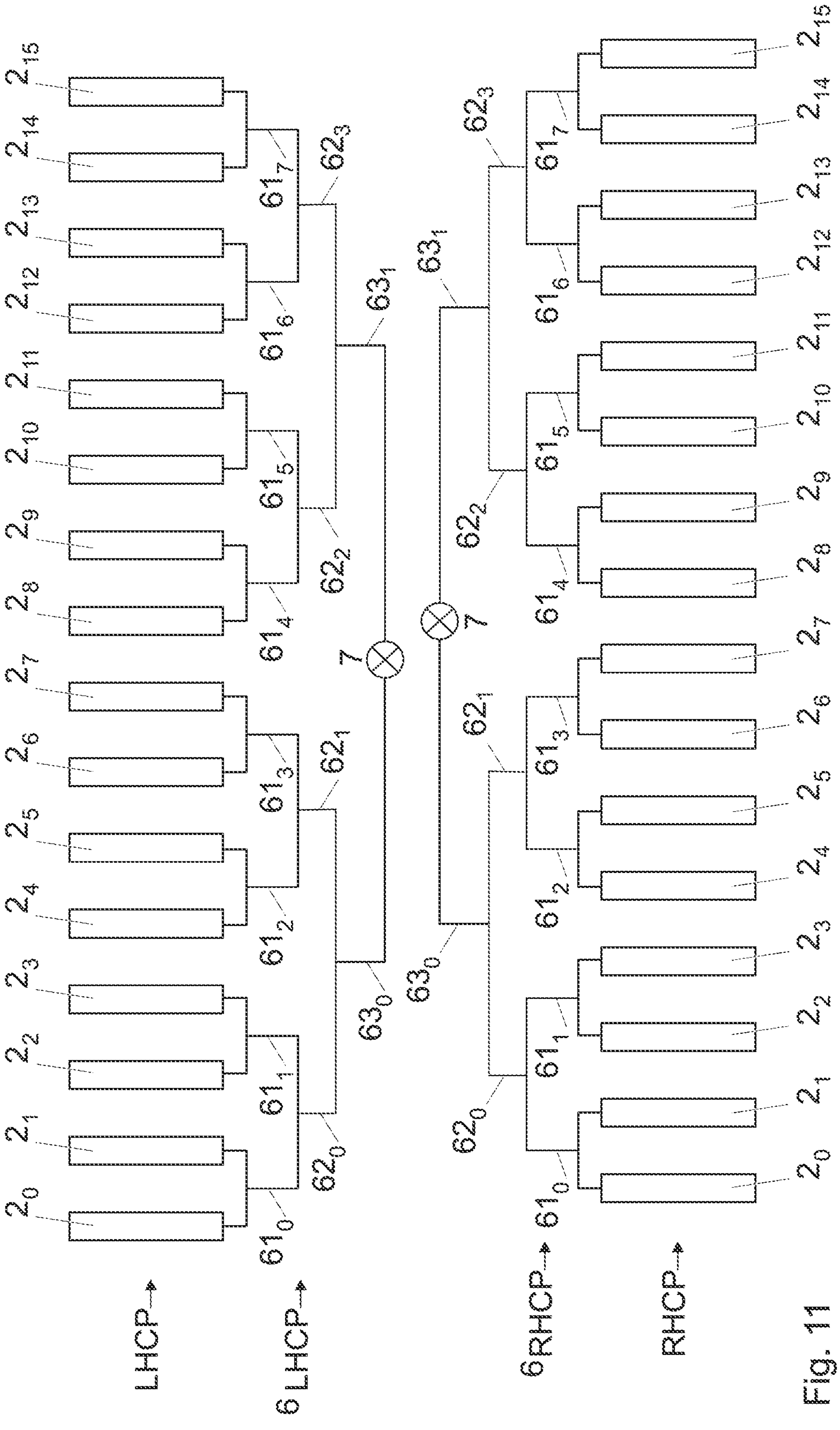
FIG. 11 shows schematically the connections within the second array of combiners/dividers.

FIG. 11 schematically illustrates the junction arborescence within the second array of dividers/combiners 6.

Figure 12:
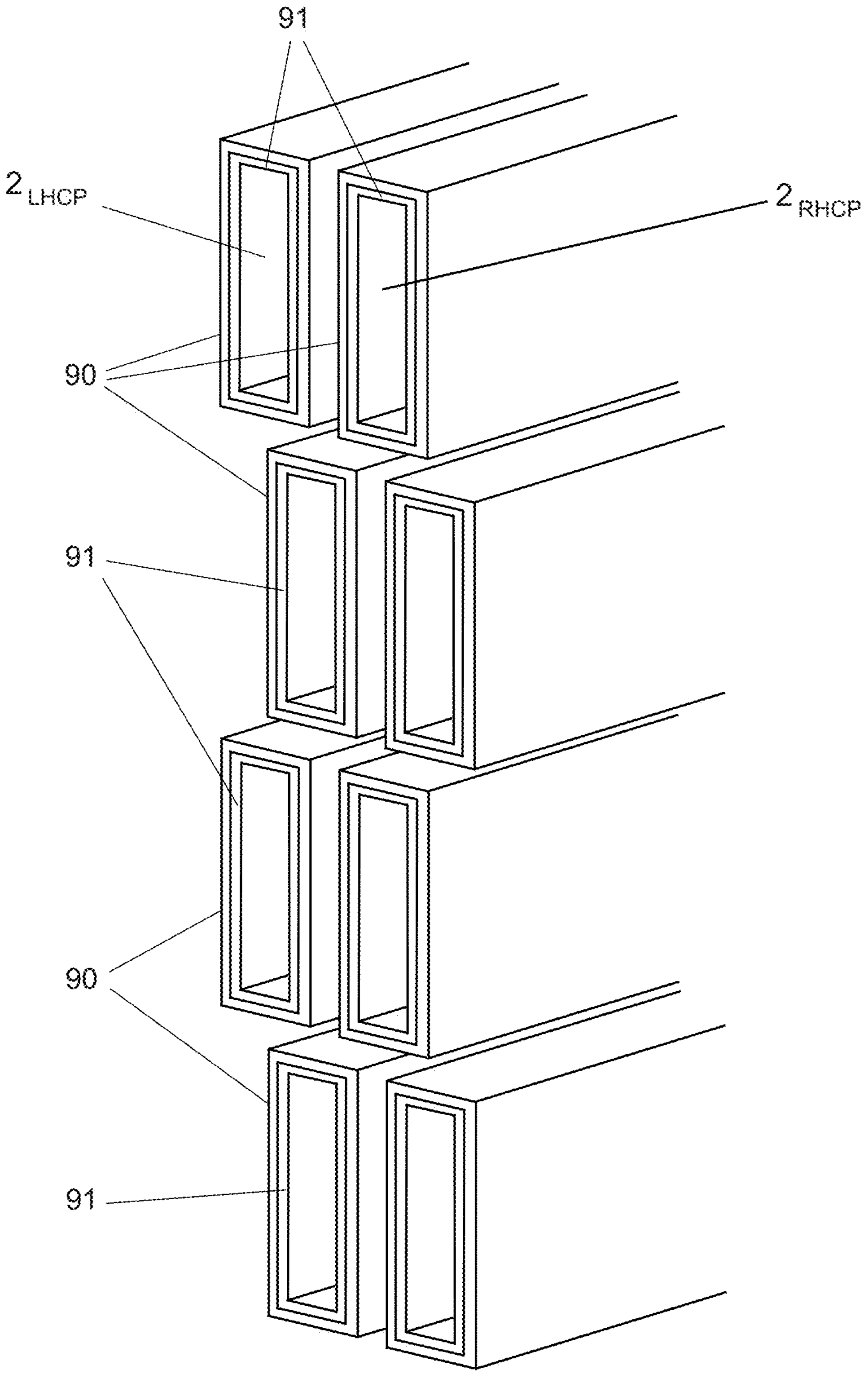
FIG. 12 schematically illustrates the radiating extremity of an antenna according to the invention.

As illustrated in FIG. 12, the antenna is advantageously made monolithically, preferably by 3D printing of a metal or polymer core 90, then deposition of a conductive layer 91 at least on the inner faces of the antenna waveguides.

The above example refers to an antenna with 16×16 antenna elements. This number is non-limiting and the number of antenna elements can be any number. However, the number of rows is preferably a multiple of 4 so that the antenna can be designed by stacking cell units with four antenna elements each. This number is also advantageously a power of two so that a first array of dividers/combiners 4 can be constructed with an equal number of junctions between each branch of this array and the stub of the blade, thus more easily guaranteeing paths of isophase length to the different branches.

The number of antenna elements per branch, and thus of blades 2, can be any number. However, this number is advantageously a power of two, so that a second array of dividers/combiners 6 can be made with an equal number of junctions between each branch of this array and the antenna ports 7, thus more easily guaranteeing isophase length paths to the different branches.

Figure 13:
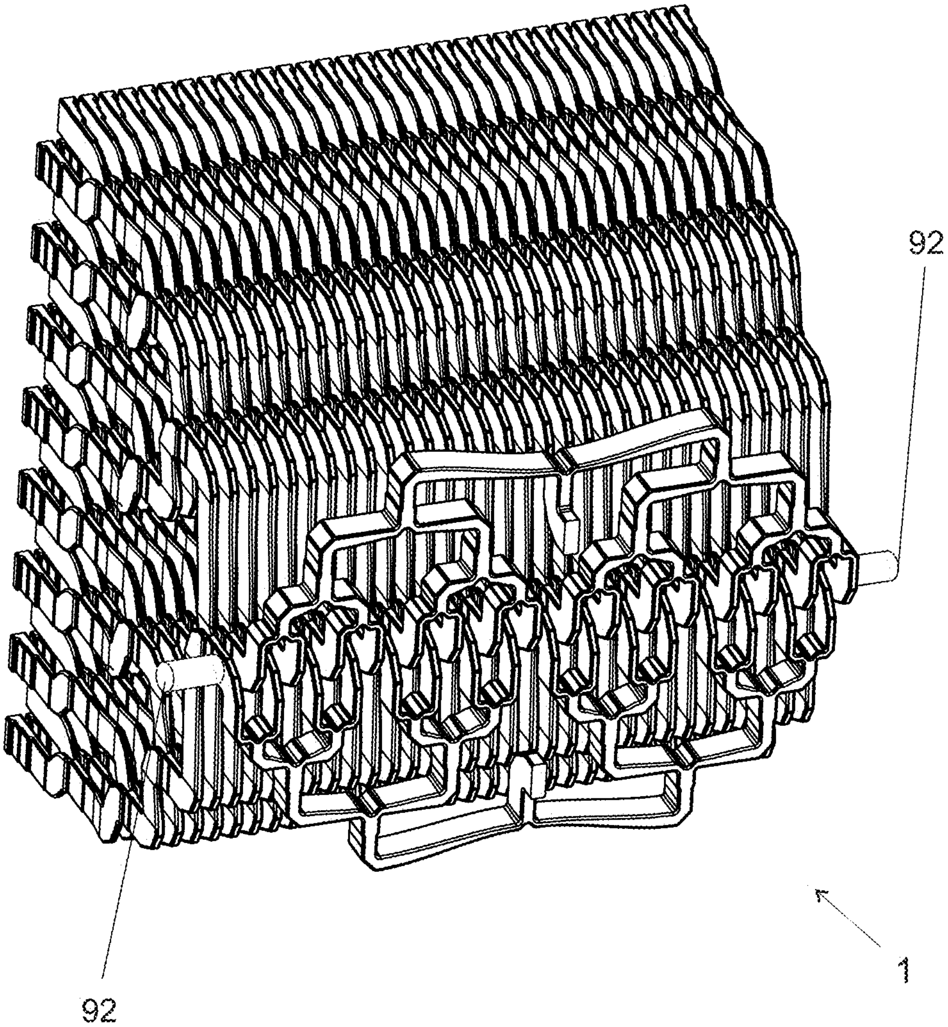
FIG. 13 illustrates an antenna according to the invention provided with mounting holes.

As illustrated in FIG. 13, the antenna may have a mounting hole 92 passing through the array of dividers in a direction perpendicular to the direction of signal transmission, allowing it to be mounted by fitting it around a cylindrical mounting rod. This solution allows the orientation of the antenna to be easily adjusted by pivoting it around the rod.

REFERENCE NUMBERS USED IN FIGURES

1 Antenna
2 Blade
21 First power divider/combiner in the blade (H plane)
22 Second power divider/combiner in the blade (H plane)
200 Branch of a power divider/combiner in the blade
201 Stub of a power divider/combiner in the blade
23 Main stub in the blade
3 Antenna element
32 Septum
4 First array of dividers/combiners (H-plane)
5 1-4 junction of a cell unit
50 First power divider/combiner in the junction
51 Second power divider/combiner in the junction
500 Branch of a 1-4 junction in the cell unit
501 Stub of a 1-4 junction in the cell unit
6 Second array of dividers/combiners (plane E)
60 Connection branch between the second array of dividers and a blade
61 First power divider/combiner in the plane E
62 Second power divider/combiner in the plane E
63 Third power divider/combiner in the plane E
64 Fourth power divider/combiner in the plane E
7 Port
8 Cell unit
LHCP Index for components related to left polarisation
RHCP Index for components related to right polarisation

What is claimed is:

1. Antenna with dual polarization, the antenna comprising:

at least one first port connecting the antenna to a first active circuit for transmitting or emitting a first polarized signal;

at least one second port connecting the antenna to a second active circuit or to the first active circuit for transmitting or emitting a second polarized signal, a plurality of dual-polarized antenna elements connected to the first and second ports, the antenna elements being arranged in cell units, each cell unit including:

four of the antenna elements, and two 1-to-4 junctions, each said junction comprising four branches and a common stub, each of the antenna elements comprising a first connection port for transmitting the first polarized signal and a second connection port for transmitting the second polarized signal, a first of the two 1-to-4 junctions being connected to each of the first connection ports in the cell unit, and a second of the two 1-to-4 junctions being connected to each of the second connection ports of the unit cell, wherein two of the four antenna elements are in a first plane and two others of the four antenna elements are in a second plane parallel to the first plane, said planes being offset from each other in a direction perpendicular to said planes by a distance smaller than a width of an antenna element in the each cell unit, an array of dividers/combiners connecting the common stub of each said 1-to-4 junction of each cell unit associated with the first polarized signal to the first port and connecting the common stub of each said 1-to-4 junction associated with the second polarized signal to the second port, the four antenna elements of each cell unit being superposed, the cell units being juxtaposed.

2. Antenna of claim 1, said array of dividers/combiners comprising a first sub-array of dividers/combiners formed by a stack of juxtaposed blades and arranged to connect together the stubs of each said 1-to-4 junction of superposed cell units associated with the first polarized signal and to connect together the stubs of each said 1-to-4 junction of superposed cell units associated with the second polarized signal.

3. Antenna of claim 2, said first sub-array of dividers/combiners comprising an alternance of first blades associated with the first polarized signal and of second blades associated with the second polarized signal.

4. Antenna of claim 3, comprising a second sub-array of dividers/combiners arranged to connect said first blades to each other and to the first port and to connect said second blades to each other and to the second port.

5. Antenna of claim 4, the second sub-array being provided between the first and second blades and the first and second ports and comprising waveguide portions extending in a second direction substantially perpendicular to a direction of signal transmission.

6. Antenna of claim 3, one of the first blades and one of the second blades extending between the two planes defined by extreme lateral edges of the antenna elements associated with these two blades.

7. Antenna of claim 3, comprising thirty-two said blades.

8. Antenna of claim 2, each blade extending in a first direction substantially perpendicular to a direction of signal transmission, and between the two planes defined by extreme lateral edges of the antenna elements associated with this blade.

9. Antenna of claim 1, each blade being associated with four cell units.

10. Antenna of claim 1, each antenna element comprising a septum for combining in transmission, or separating in reception, polarizations of the first and second polarized signals.

11. Antenna of claim 10, each antenna element being connected to two neighboring blades.

12. Antenna of claim 1, each antenna element having a square-shaped cross-section perpendicular to a direction of signal propagation.

13. Antenna of claim 1, having at least one cylindrical opening in a direction perpendicular to a direction of signal transmission, and for mounting the antenna on a rod holding and orienting the antenna.

14. Antenna of claim 1, comprising a core made by 3D printing and a surface layer at least on an inner side of the core.

* * * * *